US012562324B2

(12) United States Patent
Saito

(10) Patent No.: US 12,562,324 B2
(45) Date of Patent: Feb. 24, 2026

(54) SWITCH

(71) Applicant: ALPS ALPINE CO., LTD., Tokyo (JP)

(72) Inventor: Akizumi Saito, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 171 days.

(21) Appl. No.: 18/467,161

(22) Filed: Sep. 14, 2023

(65) Prior Publication Data

US 2024/0096566 A1 Mar. 21, 2024

(30) Foreign Application Priority Data

Sep. 20, 2022 (JP) ................................ 2022-149125

(51) Int. Cl.
*H01H 13/06* (2006.01)
*H01H 13/52* (2006.01)

(52) U.S. Cl.
CPC ............. *H01H 13/06* (2013.01); *H01H 13/52* (2013.01)

(58) Field of Classification Search
CPC .......... H01H 13/06; H01H 13/52; H01H 9/04; H01H 3/12; H01H 5/00; H01H 9/00; H01H 9/02; H01H 9/0242; H01H 13/00; H01H 13/14; H01H 13/50; H01H 71/00; H01H 71/02; H01H 71/0214; H01H 2001/58; H01H 2003/12; H01H 2009/02; H01H 2013/00; H01H 2013/02; H01H 2013/50; H01H 2203/034; H01H 2227/022
USPC ...................................................... 200/302.1
See application file for complete search history.

(56) References Cited

U.S. PATENT DOCUMENTS 7,183,589 B2 * 2/2007 Kameyama ............ H10F 77/50 257/E33.059

FOREIGN PATENT DOCUMENTS

JP 2020-113432 7/2020
JP 2020113432 A * 7/2020 ............ H01H 13/06

* cited by examiner

*Primary Examiner* — Anthony R Jimenez
(74) *Attorney, Agent, or Firm* — IPUSA, PLLC

(57) ABSTRACT

A switch includes a housing and a metal terminal that is insert-molded into the housing. The metal terminal includes a contact portion provided on a first side of the metal terminal, an external connection portion provided on a second side of the metal terminal, and an embedded portion provided between the contact portion and the external connection portion and embedded in the housing. In the embedded portion, groove portions are formed in a front surface of the metal terminal and a rear surface of the metal terminal, the groove portions in the front surface being formed at positions different from the groove portions in the rear surface. The groove portions extend in a widthwise direction that is a direction intersecting an extending direction of the embedded portion.

15 Claims, 8 Drawing Sheets

SWITCH

CROSS-REFERENCE TO RELATED APPLICATIONS

The present application is based on and claims priority to Japanese Patent Application No. 2022-149125 filed on Sep. 20, 2022, the entire contents of which are hereby incorporated by reference.

BACKGROUND

The present disclosure relates to a switch.

Japanese Laid-Open Patent Publication No. 2020-113432 relates to an input device including a metal member, and discloses a technique of providing an intermediate portion embedded in a resin casing with recessed and projecting portions across the intermediate portion, thereby enhancing adhesiveness between the resin casing and the intermediate portion and suppressing entry of water into a housing portion of the resin casing from a gap between the metal member and the resin casing.

SUMMARY

A switch according to one embodiment includes a housing and a metal terminal that is insert-molded into the housing. The metal terminal includes a contact portion provided on a first side of the metal terminal, an external connection portion provided on a second side of the metal terminal, and an embedded portion provided between the contact portion and the external connection portion and embedded in the housing. In the embedded portion, portion, groove portions are formed in a front surface of the metal terminal and a rear surface of the metal terminal, the groove portions in the front surface being formed at positions different from the groove portions in the rear surface. The groove portions extend in a widthwise direction that is a direction intersecting an extending direction of the embedded portion.

DETAILED DESCRIPTION

Figure 1:
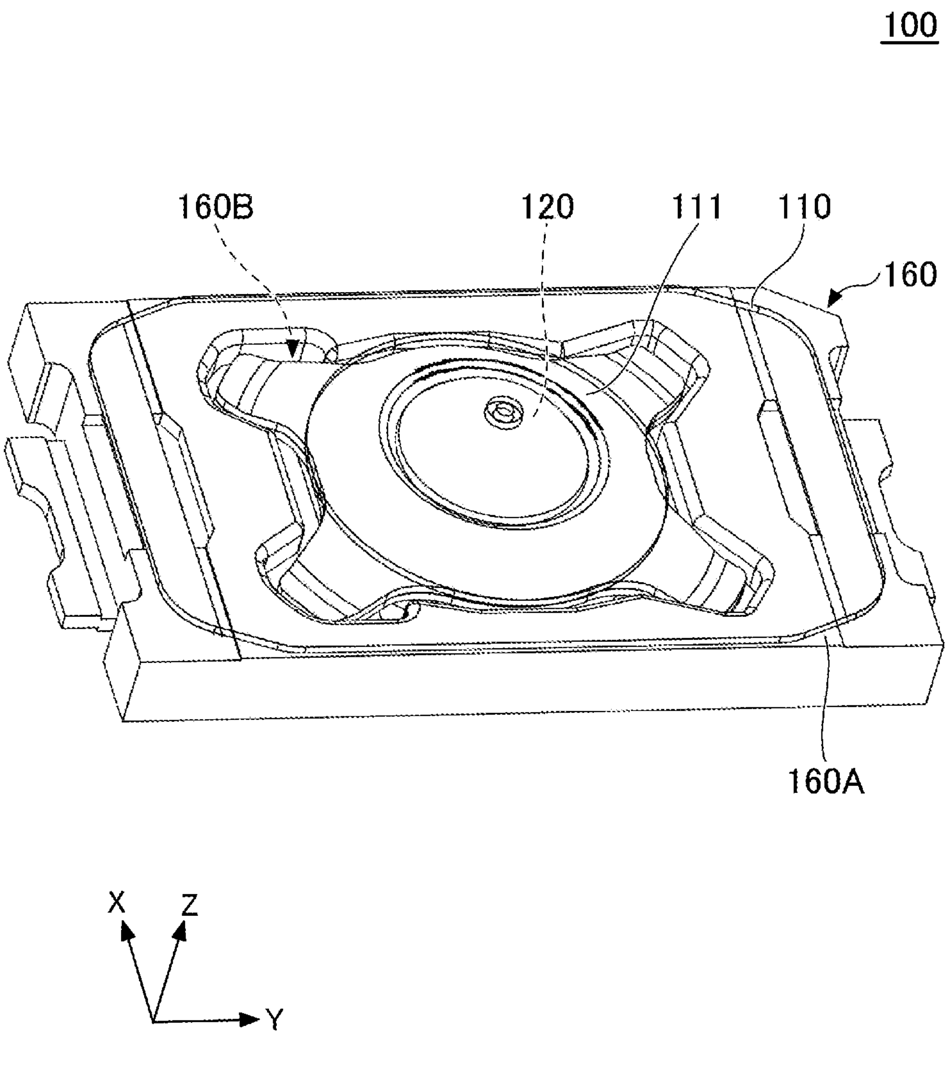
FIG. 1 is a perspective view of an outer appearance of a switch according to one embodiment.

The technique of Japanese Laid-Open Patent Publication No. 2020-113432 may cause entry of flux into a contact portion of the metal member through travelling of the flux in the intermediate portion of the metal member upon soldering for a terminal of the metal member.

Hereinafter, referring to the drawings, one embodiment will be described. Note in the following description that, for the sake of convenience, a Z-axis direction in the drawings is referred to as an upward-and-downward direction, a Y-axis direction in the drawings is referred to as a leftward-and-rightward direction, and an X-axis direction in the drawings is referred to as a forward-and-backward direction. However, a positive Z-axis direction is an upward direction, a positive Y-axis direction is a rightward direction, and a positive X-axis direction is a forward direction.

(Overview of Switch 100)

FIG. 1 is a perspective view of the outer appearance of the switch 100 according to one embodiment. As illustrated in FIG. 1, the switch 100 is formed, as a whole, in a rectangular parallelepiped shape that is thin in the upward-and-downward direction (Z-axis direction). As illustrated in FIG. 1, in the switch 100, a top surface 160A and a housing portion 160B of the housing 160 are covered with an insulator 110 that is transparent. At a central portion of the insulator 110, a bump portion 111 is formed in a shape that is projecting upward (positive Z-axis direction). A press body 120 is adhered to a rear surface (negative Z-axis side) of the bump portion 111. Thereby, the switch 100 allows for a downward (negative Z-axis direction) pressing operation via the press body 120.

The switch 100 is in an OFF state when the pressing operation is not applied to the press body. The switch 100 switches to be in an ON state when the downward (negative Z-axis direction) pressing operation is applied to the press body 120.

(Configuration of Switch 100)

Figure 2:
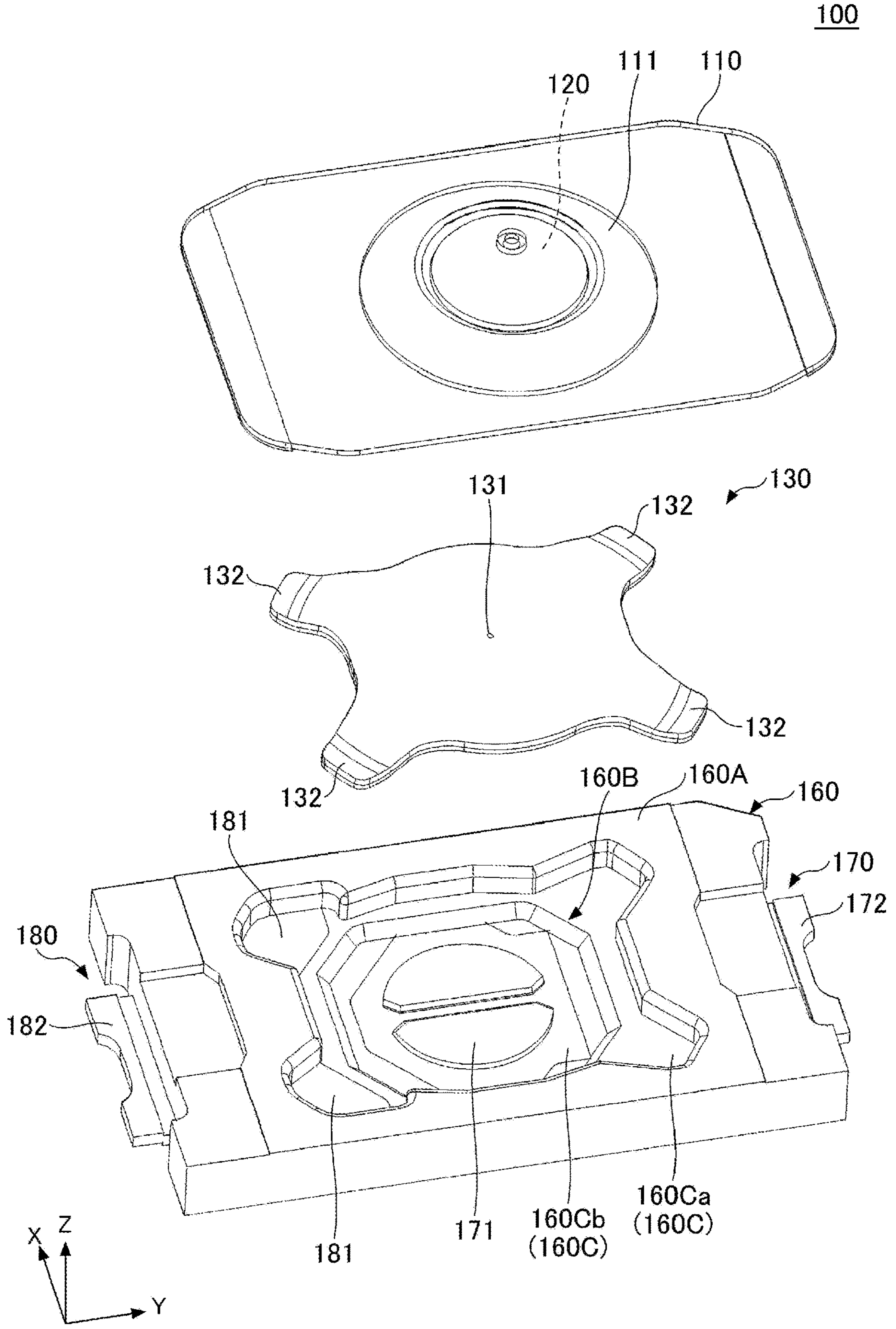
FIG. 2 is an exploded perspective view of the switch according to one embodiment.
Figure 3:
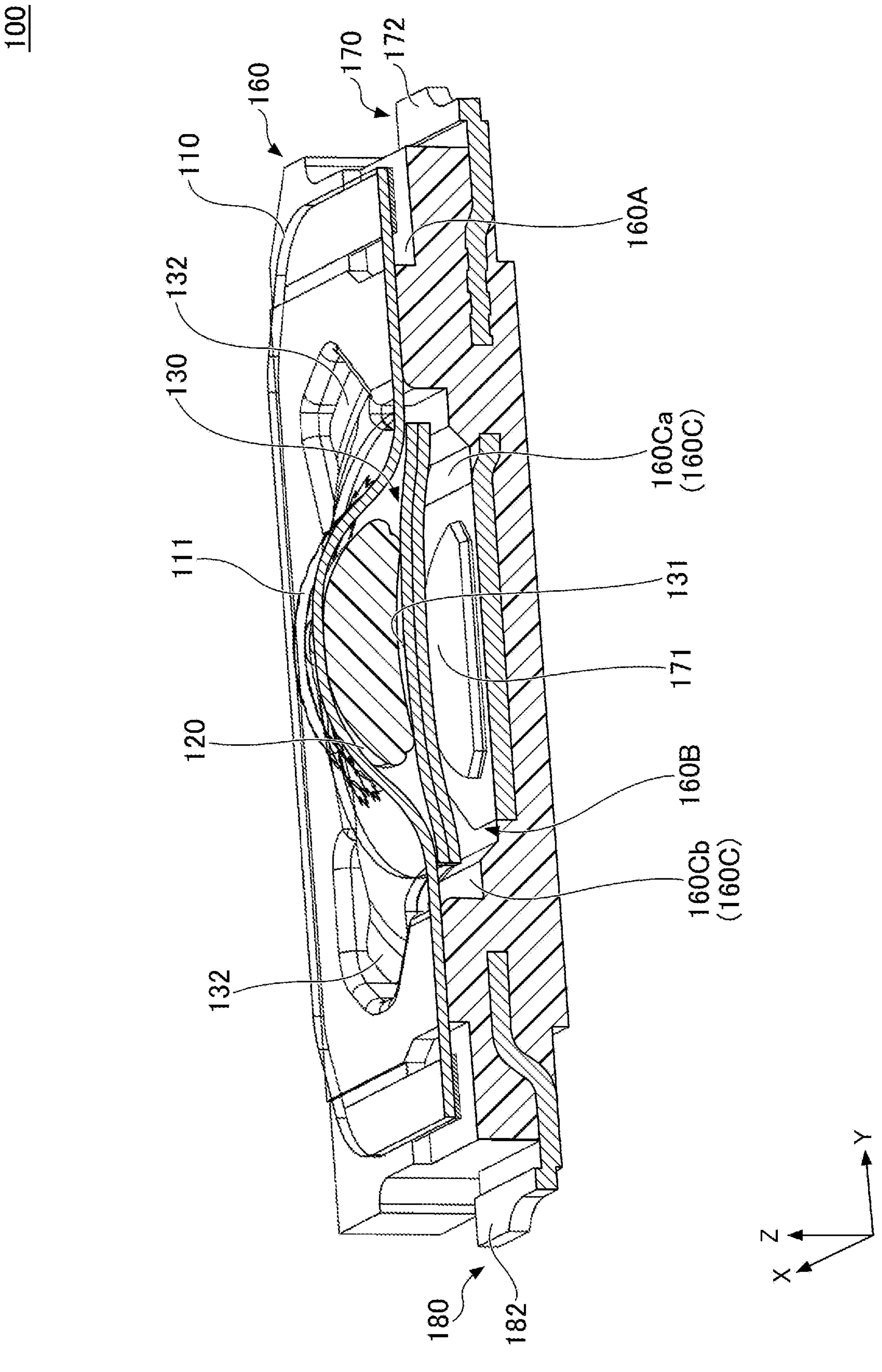
FIG. 3 is a cross-sectional perspective view of the switch according to one embodiment, taken along a YZ plane.

FIG. 2 is an exploded perspective view of the switch 100 according to one embodiment. FIG. 3 is a cross-sectional perspective view of the switch 100 according to one embodiment, taken along the YZ plane. As illustrated in FIG. 2 and FIG. 3, the switch 100 includes the housing 160, a metal contact 130, the press body 120, and the insulator 110 in order from the downward side (negative Z-axis side) in the drawings.

<Housing 160>

The housing 160 is a member in the form of a container, and the member is formed in a rectangular parallelepiped shape that is thin in the upward-and-downward direction (Z-axis direction). In a plan view from above, the housing 160 has a rectangular shape in which the leftward-and-rightward direction (Y-axis direction) is a longitudinal direction and the forward-and-backward direction (X-axis direction) is a transverse direction. The housing 160 has a housing portion 160B formed in a shape that is recessed downward from the top surface 160A. In the housing portion 160B, the metal contact 130 is housed. For example, the housing 160 uses a relatively hard insulating material (e.g., a hard resin) and is integrally formed with the central fixation contact member 170 and the peripheral fixation contact member 180 through insert molding.

A bottom portion 160C of the housing portion 160B of the housing 160 includes a central portion 160Ca and a peripheral portion 160Cb.

The central portion 160Ca is formed at the center of the bottom portion 160C. The central portion 160Ca is provided with a central fixation contact 171 included in the central fixation contact member 170.

The peripheral portion 160Cb is formed at an outer side of the central portion 160Ca so as to surround the central portion 160Ca. The peripheral portion 160Cb has a higher height position than the central portion 160Ca. The peripheral portion 160Cb is provided with peripheral fixation contacts 181 included in the peripheral fixation contact member 180. The metal contact 130 is placed in the peripheral portion 160Cb.

The central fixation contact member 170 and the peripheral fixation contact member 180 are members that are formed of metal and formed in a generally flat plate. The central fixation contact member 170 and the peripheral fixation contact member 180 are integrally formed with the housing 160 through insert molding. For example, the central fixation contact member 170 and the peripheral fixation contact member 180 are formed by processing a metal plate with various processing methods (e.g., a pressing process, a bend process, or a laser process).

The central fixation contact member 170 is one example of "metal terminal". The central fixation contact member 170 includes the central fixation contact 171 at a left-hand (negative Y-axis side) end portion and an external connection terminal 172 at a right-hand (positive Y-axis side) end portion. The central fixation contact 171 is one example of "contact portion" and disposed in the central portion 160Ca of the bottom portion 160C of the housing 160. The external connection terminal 172 is provided to project from the right-hand (positive Y-axis side) lateral surface of the housing 160 and is to be connected to the exterior. The other portions of the central fixation contact member 170 (portions other than the central fixation contact 171 and the external connection terminal 172) are embedded in the housing 160.

The peripheral fixation contact member 180 includes: at the right-hand (positive Y-axis side) end portion, a pair of peripheral fixation contacts 181 that are along the forward-and-backward direction (X-axis direction); and an external connection terminal 182 at the left-hand (negative Y-axis side) end portion. The pair of peripheral fixation contacts 181 are disposed in the peripheral portion 160Cb of the bottom portion 160C of the housing 160. The external connection terminal 182 is provided to project from the left-hand (negative Y-axis side) lateral surface of the housing 160 and is to be connected to the exterior. The other portions of the peripheral fixation contact member 180 (portions other than the peripheral fixation contacts 181 and the external connection terminal 182) are embedded in the housing 160.

<Metal Contact 130>

The metal contact 130 is a dome-shaped member that is projecting upward (positive Z-axis direction) and includes a top portion 131 at the central portion thereof. The metal contact 130 is formed using one or more thin metal plates. In the present embodiment, as one example, the metal contact 130 is formed of two thin metal plates that are overlaid on top of each other. The metal contact 130 is housed in the housing portion 160B of the housing 160, and placed at the peripheral portion 160Cb of the bottom portion 160C of the housing portion 160B. Thereby, the metal contact 130 contacts the peripheral fixation contacts 181 provided at the peripheral portion 160Cb, and is electrically connected to the peripheral fixation contact member 180. The metal contact 130 is what is called "reverse spring". In response to application of the pressing operation to the press body 120, the top portion 131 is pressed downward via the press body 120, and once a predetermined operation load has been exceeded, the top portion 131 rapidly elastically deforms into a recessed shape (reverse motion). Thereby, the metal contact 130 contacts the central fixation contact 171 at a rear portion of the top portion 131, and further is electrically connected to the central fixation contact member 170. The metal contact 130 returns to the original projecting shape by an elastic force upon release of the pressing force from the press body 120.

Note that, in the present embodiment, the metal contact 130 is formed by partially cutting a circular dome-shaped metal plate in a plan view from above, and includes four leg portions 132 respectively projecting in four mutually different directions in the plan view from above. In the present embodiment, the four leg portions 132 of the metal contact 130 are placed in the peripheral portion 160Cb of the housing 160, and two leg portions 132 thereof contact the peripheral fixation contacts 181.

<Press Body 120>

The press body 120 is a member that is disposed above the top portion 131 of the metal contact 130 and within a rear space of the bump portion 111 of the insulator 110. The press body 120 is circular in a plan view from above and has a three-dimensional shape projecting upward from the top portion 131 of the metal contact 130. The press body 120 is formed of a resin material such as polyethylene terephthalate (PET). The press body 120 has a curved top surface portion contouring the bump portion 111 of the insulator 110. The press body 120 is adhered, on the top surface portion thereof, to a rear portion of the bump portion 111 of the insulator 110 by given adhesion means (e.g., laser welding). In the present embodiment, the press body 120 has such a three-dimensional shape that a hemispherical shape is collapsed in the upward-and-downward direction (Z-axis direction). However, this is by no means a limitation. The press body 120 may be, for example, a cylindrical shape or an ellipsoidal shape. Also, the press body 120 is not limited to the press body that is circular in a plan view from above.

<Insulator 110>

The insulator 110 is a thin-sheet member disposed on the top surface 160A of the housing 160. The insulator 110 is formed of a resin material such as PET. In a plan view from above, the insulator 110 has approximately the same shape as the top surface 160A of the housing 160; i.e., an approximately rectangular shape in which the leftward-and-rightward direction (Y-axis direction) is a longitudinal direction and the forward-and-backward direction (X-axis direction) is a transverse direction. With the insulator 110 covering the top surface 160A of the housing 160, the insulator 110 is adhered to the top surface 160A of the housing 160 by given adhesion means (e.g., laser welding). The insulator 110 closes an upper opening of the housing portion 160B of the housing 160, and seals the housing portion 160B. At the central portion of the insulator 110, the bump portion 111 formed in a shape projecting upward (positive Z-axis direction) is formed. As illustrated in FIG. 3, the press body 120 is adhered to the rear portion of the bump portion 111.

(Operation of Switch 100)

According to the switch 100 according to one embodiment, when the pressing operation is not applied to the press body 120, the metal contact 130 contacts the peripheral fixation contacts 181 and does not contact the central fixation contact 171. Therefore, the switch 100 according to one embodiment is in an OFF state when the pressing operation is not applied to the press body 120.

According to the switch 100 according to one embodiment, when the pressing operation is applied to the press body 120, the press body 120 pushes down the top portion 131 of the metal contact 130, and elastically deforms the top portion 131 of the metal contact 130 so as to be in a recessed shape (reverse motion). Thereby, the rear portion of the top portion 131 contacts the central fixation contact 171, and the metal contact 130 is electrically connected to the central fixation contact member 170. As a result, the switch 100 switches to be in an ON state through conduction, via the central fixation contact member 170, between: the central fixation contact member 170 and the central fixation contact 171; and the peripheral fixation contact member 180 and the peripheral fixation contacts 181.

Note that, according to the switch 100 according to one embodiment, when the pressing operation applied to the press body 120 has been stopped, the metal contact 130 returns to the original projecting shape by its own elastic force. As a result, the metal contact 130 ceases being contact with the central fixation contact 171, and the switch 100 returns to be in an OFF state.

(Configuration of Central Fixation Contact Member 170)

Figure 4:
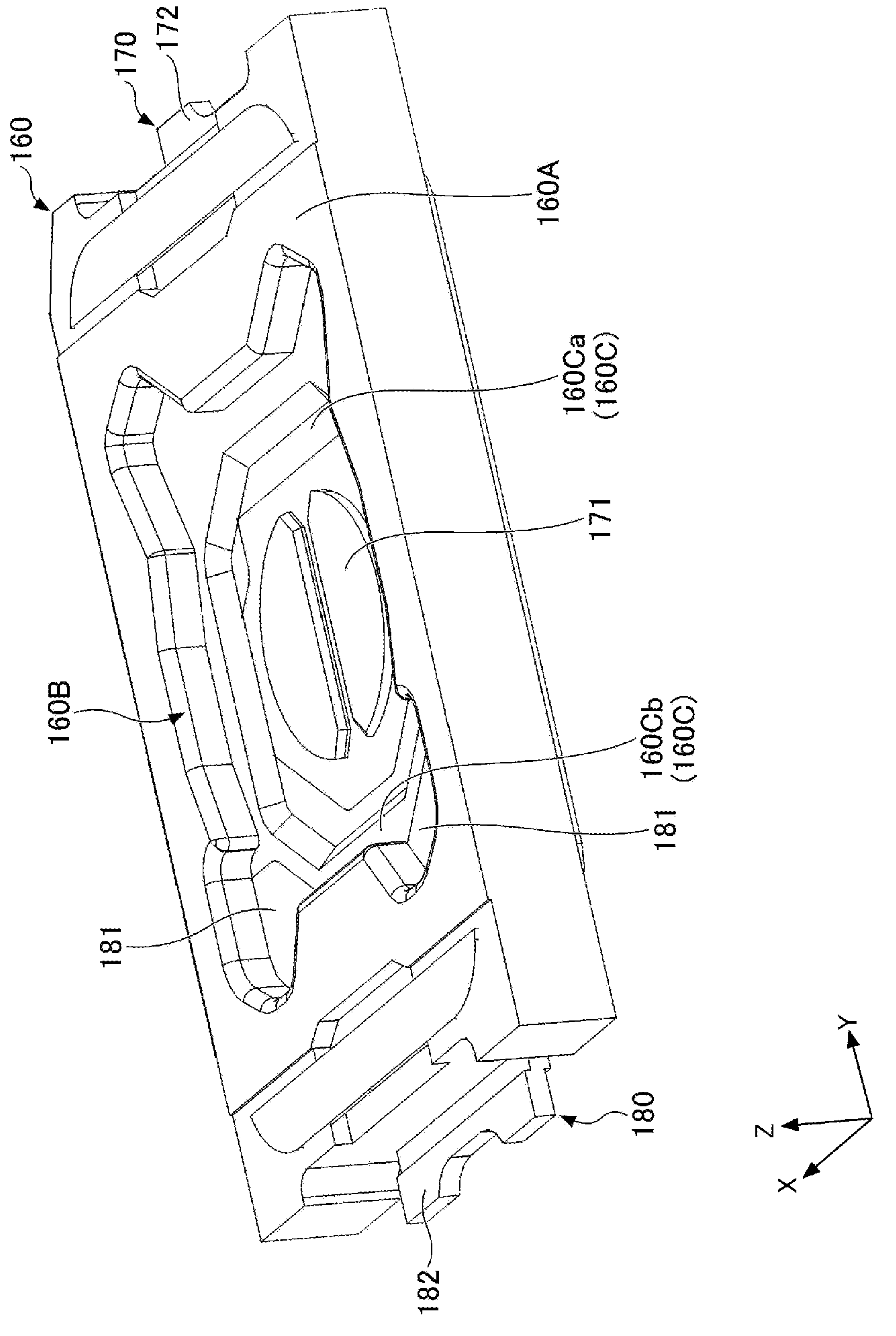
FIG. 4 is a perspective view of an outer appearance of a housing included in the switch according to one embodiment.
Figure 5:
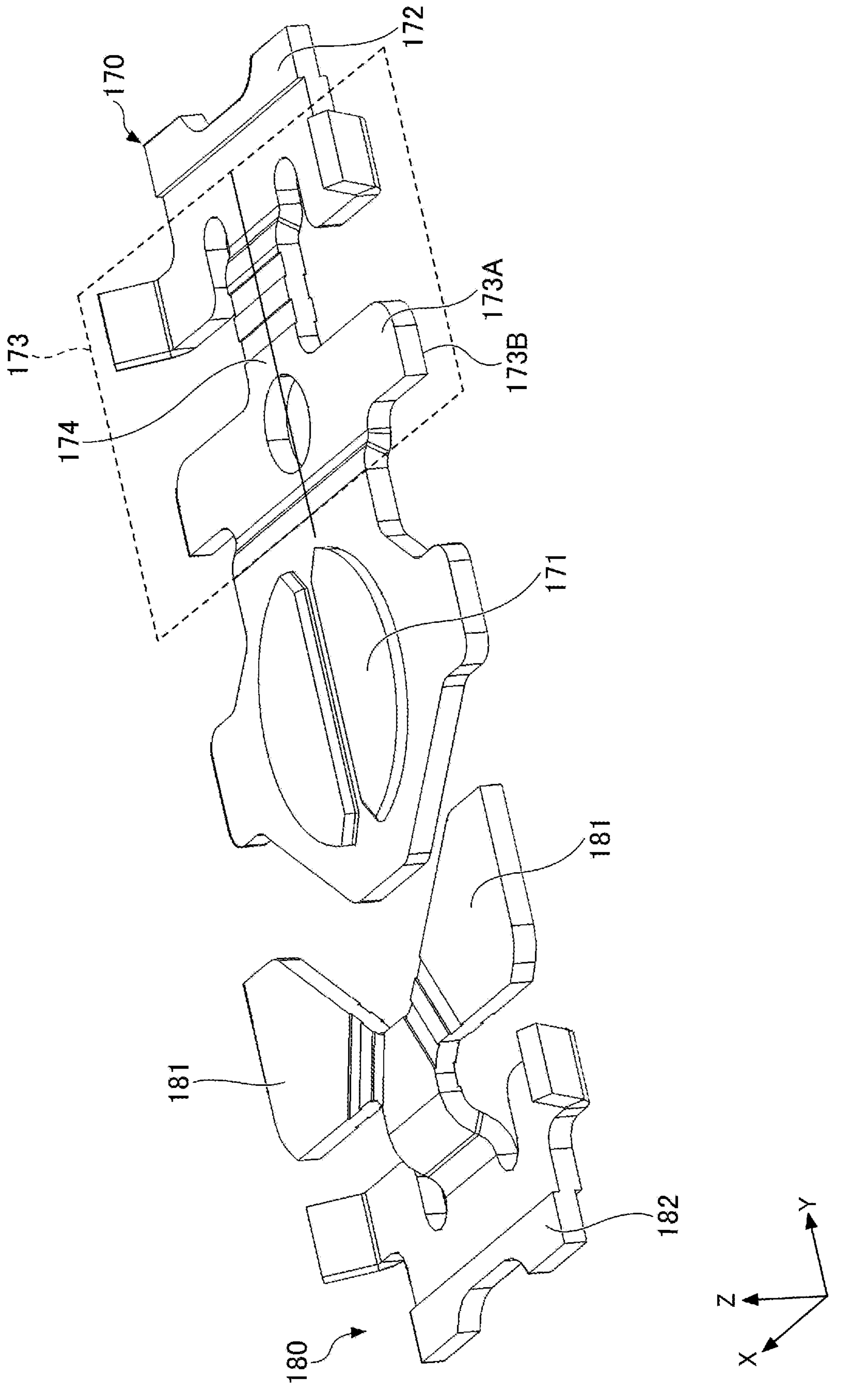
FIG. 5 is a perspective view of an outer appearance of a central fixation contact member and a peripheral fixation contact member included in the switch according to one embodiment.
Figure 6:
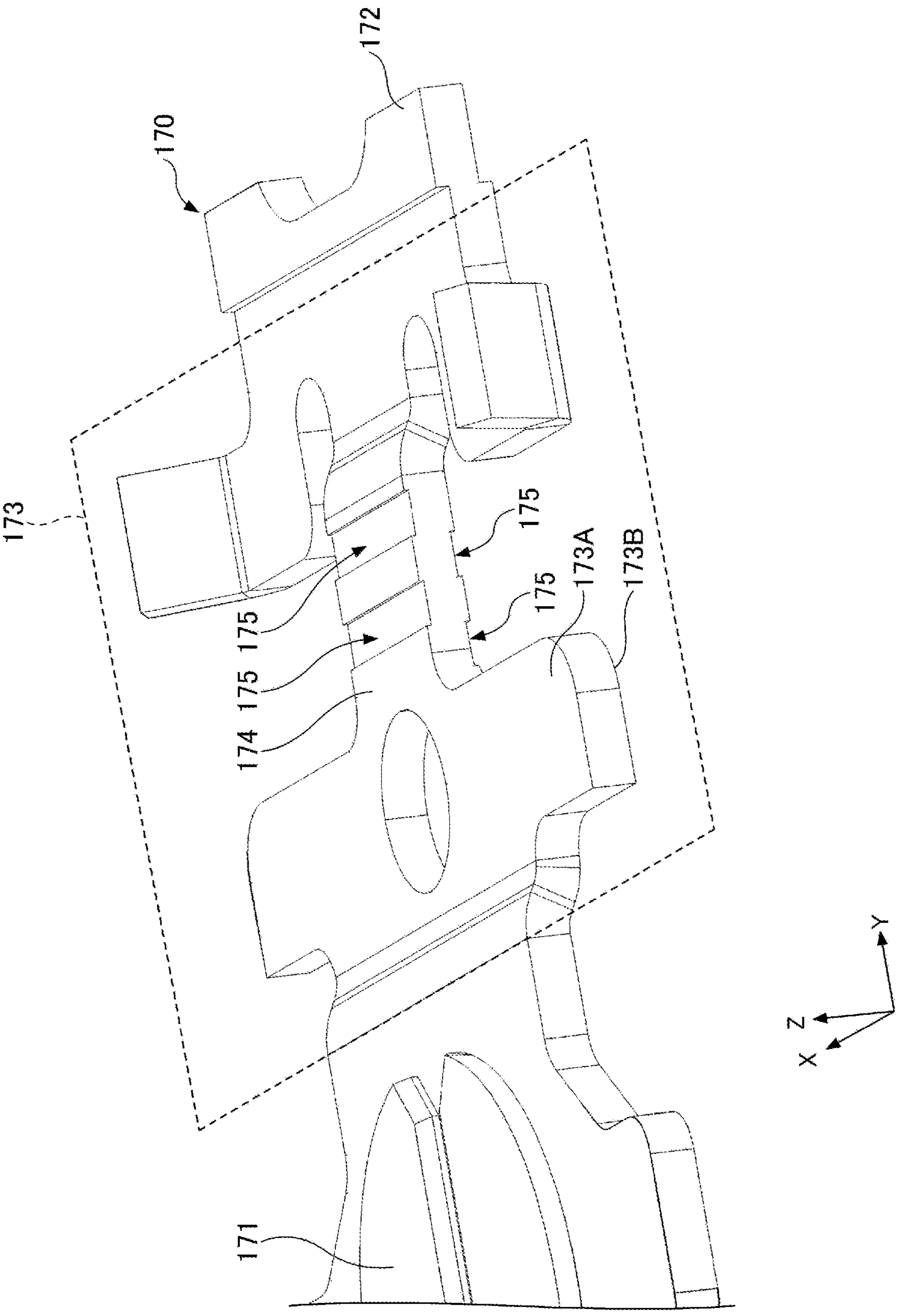
FIG. 6 is a partially enlarged perspective view of the central fixation contact member included in the switch according to one embodiment.
Figure 7:
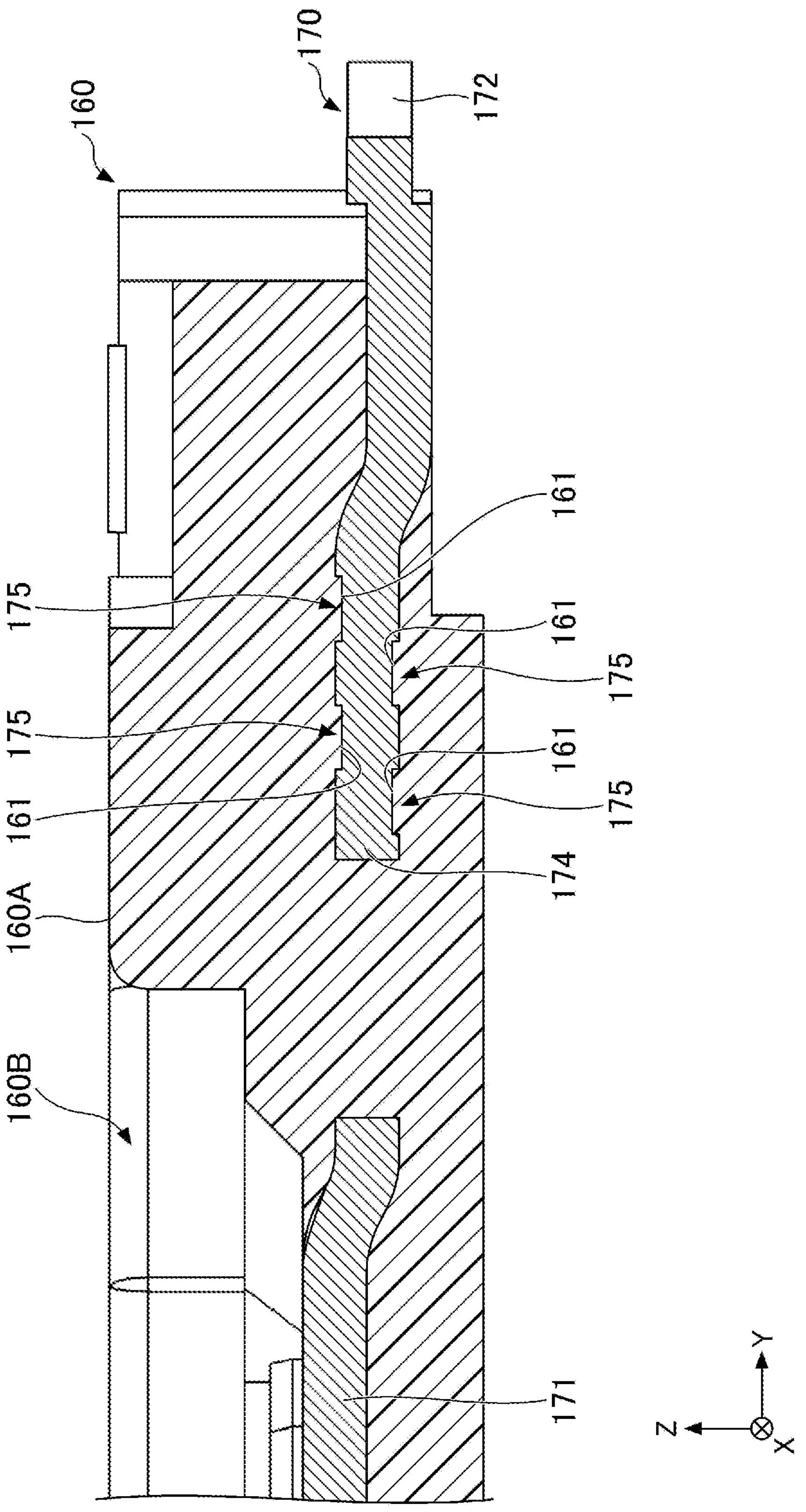
FIG. 7 is a partially enlarged cross-sectional view of a housing included in the switch according to one embodiment.

FIG. 4 is a perspective view of the outer appearance of the housing 160 included in the switch 100 according to one embodiment. FIG. 5 is a perspective view of the outer appearance of the central fixation contact member 170 and the peripheral fixation contact member 180 included in the switch 100 according to one embodiment. FIG. 6 is a partially enlarged perspective view of the central fixation contact member 170 included in the switch 100 according to one embodiment. FIG. 7 is a partially enlarged cross-sectional view of the housing 160 included in the switch 100 according to one embodiment.

As illustrated in FIG. 4 and FIG. 5, the central fixation contact member 170 includes the central fixation contact 171 (one example of "contact portion") at the left-hand (negative Y-axis side) end portion and the external connection terminal 172 (one example of "external connection portion") at the right-hand (positive Y-axis side) end portion. The central fixation contact 171 is disposed in the central portion 160Ca of the bottom portion 160C of the housing 160. The external connection terminal 172 is provided to project from the right-hand (positive Y-axis side) lateral surface of the housing 160.

Also, as illustrated in FIG. 5, the central fixation contact member 170 includes an embedded portion 173 between the central fixation contact 171 and the external connection terminal 172, the embedded portion 173 being to be embedded in the housing 160.

The embedded portion 173 is extended in the leftward-and-rightward direction (Y-axis direction) that is an extending direction and in the forward-and-backward direction (X-axis direction) that is a widthwise direction. As illustrated in FIG. 6, the embedded portion 173 has a plurality of groove portions 175 extending in the widthwise direction (X-axis direction), the groove portions 175 being alternately formed in a front surface 173A and in a rear surface 173B.

Thereby, in the switch 100 according to one embodiment, when the housing 160 is insert-molded, the resin of the housing 160 enters the plurality of groove portions 175, thereby forming a plurality of wall portions 161 in the plurality of groove portions 175 (see FIG. 7).

According to the switch 100 according to one embodiment, therefore, when soldering is performed on the external connection terminal 172, the plurality of wall portions 161 can prevent flux from spreading to (i.e., wetting) the central fixation contact 171 side (negative Y-axis side) from the external connection terminal 172 side (positive Y-axis side) in the front surface 173A and the rear surface 173B of the embedded portion 173.

Also, according to the switch 100 according to one embodiment, the outflow path of flux is expanded by the presence of the plurality of groove portions 175 in the front surface 173A and the rear surface 173B of the embedded portion 173. This also contributes to suppression of flux from spreading to (i.e., wetting) the central fixation contact 171 side (negative Y-axis side) from the external connection terminal 172 side (positive Y-axis side).

Moreover, according to the switch 100 according to one embodiment, the resin of the housing 160 enters the plurality of groove portions 175, thereby increasing adhesiveness between the resin of the housing 160 and the front surface 173A and the rear surface 173B of the embedded portion 173 (i.e., approximately no gap occurs therebetween). This also contributes to suppression of flux from spreading to (i.e., wetting) the central fixation contact 171 side (negative Y-axis side) from the external connection terminal 172 side (positive Y-axis side).

According to the switch 100 according to one embodiment, therefore, when soldering is performed on the external connection terminal 172, it is possible to suppress entry of flux into the central fixation contact 171.

In particular, the switch 100 according to one embodiment has the plurality of groove portions 175 that are alternately formed in the front surface 173A and in the rear surface 173B. Therefore, as compared with a case where the groove portions 175 are formed at the same positions in the front surface 173A and the rear surface 173B of the embedded portion 173, each of the groove portions can be formed deeper, and thus it is possible to increase the effect of suppressing entry of flux.

In particular, as illustrated in FIG. 6, the embedded portion 173 includes a narrow-width portion 174 that is partially narrow in width, and the plurality of groove portions 175 are formed in the narrow-width portion 174.

Thereby, according to the switch 100 according to one embodiment, the groove portions 175 can be made shorter in length than in a case where the groove portions 175 are formed in the other portions of the embedded portion 173.

Note that, in the examples as illustrated in FIG. 6 and FIG. 7, two groove portions 175 are formed in each of the front surface 173A and the rear surface 173B of the embedded portion 173, but three or more groove portions 175 may be formed.

Also, in the examples as illustrated in FIG. 6 and FIG. 7, the cross-sectional shape of the groove portion 175 is a rectangular shape that is open in a top portion thereof. However, the cross-sectional shape of the groove portion 175 may be another shape (e.g., a V shape, a U shape, or a trapezoidal shape that is open in a top portion thereof). Also, two groove portions 175 may be formed next to each other in each of the front surface 173A and the rear surface 173B of the embedded portion 173 such that the two groove portions 175 in the front surface 173A are formed at positions different from the two groove portions 175 in the rear surface 173B.

Also, the groove portions 175 are preferably formed through a laser process. Thereby, according to the switch 100 according to one embodiment, it is possible to form the groove portions 175 each having a cross-sectional shape becoming narrower in groove width as the groove portions become deeper and having an inner surface that is a coarse surface. This can increase the effect of entry of the resin of the housing 160 into the inner surfaces of the groove portions 175.

Also, as illustrated in FIG. 6 and FIG. 7, the groove portions 175 preferably have such a length in the forward-and-backward (X-axis direction) that can completely traverse the narrow-width portion 174 (i.e., a length the same as the width of the narrow-width portion 174). Thereby, according to the switch 100 according to one embodiment, it is possible to increase the effect of the groove portions 175 on suppression of entry of flux.

Also, as illustrated in FIG. 6 and FIG. 7, the groove portions 175 are preferably orthogonal to the extending direction of the narrow-width portion 174. However, it is enough for the groove portions 175 to at least intersect the extending direction of the narrow-width portion 174.

Also, the depth of the groove portions 175 is preferably equal to or less than 50% of the plate thickness of the narrow-width portion 174. For example, when the plate thickness of the narrow-width portion 174 is 50 micrometers, the depth of the groove portions 175 is preferably equal to or less than 25 micrometers. Thereby, the switch 100 according to one embodiment can suppress reduction in strength of the narrow-width portion 174.

Also, when the groove portions 175 are formed through a laser process, projecting bump portions may be formed along the edge portions of the groove portions 175 in the front surface 173A and the rear surface 173B of the embedded portion 173. In this case, according to the switch 100 according to one embodiment, it is possible to further increase the effect of suppressing entry of flux by virtue of the bump portions.

One Modified Example of Configuration of the Housing 160

Figure 8:
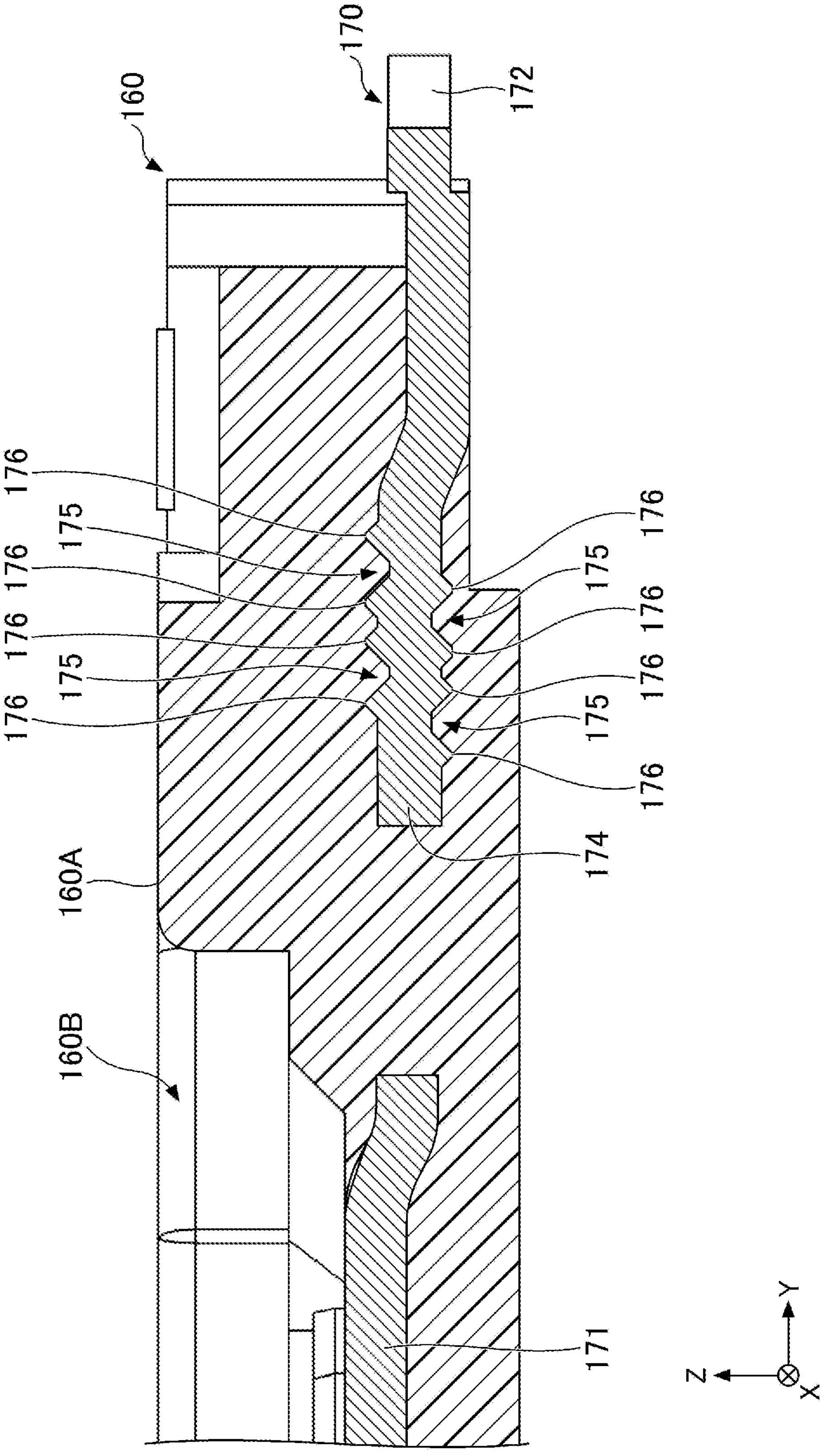
FIG. 8 is a partially enlarged cross-sectional view of one modified example of the configuration of a housing 160 included in a switch 100 according to one embodiment.

FIG. 8 is a partially enlarged cross-sectional view of one modified example of the configuration of the housing 160 included in the switch 100 according to one embodiment.

In the example as illustrated in FIG. 8, two groove portions 175 are formed in each of the front surface 173A and the rear surface 173B in the narrow-width portion 174 of the embedded portion 173 of the central fixation contact member 170. These groove portions 175 are formed alternately in the front surface 173A and in the rear surface 173B in the extending direction (Y-axis direction) of the central fixation contact member 170.

Also, in the example as illustrated in FIG. 8, the plurality of groove portions 175 are each formed through irradiation with laser light. Thereby, each of the plurality of groove portions 175 that have been formed has a cross-sectional shape becoming narrower in groove width as the groove portions become deeper and has an inner surface that is a coarse surface.

Therefore, the switch 100 according to one embodiment can increase the effect of entry of the resin of the housing 160 into the inner surfaces of the groove portions 175.

Also, in the example as illustrated in FIG. 8, since the groove portions 175 have been formed through laser irradiation, bump portions 176 are formed along both left-hand and right-hand edge portions of each of the groove portions 175 in the narrow-width portion 174 of the embedded portion 173 of the central fixation contact member 170. The bump portions 176 are portions that are projecting in the upward-and-downward direction more than the front surface 173A and the rear surface 173B.

The switch 100 according to one embodiment includes the bump portions 176, and can increase the effect of entry of the resin of the housing 160 and the effect of suppressing entry of flux.

Note that, as one example, the groove width of the groove portion 175 at a bottom end portion thereof is 0.01 mm. Also, as one example, the groove width of the groove portion 175 at a top end portion thereof is 0.05 mm. Also, as one example, the depth of the groove portion 175 relative to the front surface 173A and the rear surface 173B is 0.01 mm. Also, as one example, the height of the bump portion 176 relative to the front surface 173A and the rear surface 173B is 0.01 mm.

According to one embodiment, it is possible to suppress entry of flux into a contact portion of a metal terminal upon soldering for the metal terminal.

While exemplary embodiments of the present invention have been described above in detail, the present invention is not limited to these embodiments. Various changes or modifications are possible within the scope of the gist of the present invention recited in the claims.

What is claimed is:

1. A switch, comprising:
a housing; and
a metal terminal that is insert-molded into the housing, the metal terminal including
a contact portion provided on a first side of the metal terminal,
an external connection portion provided on a second side of the metal terminal, and
an embedded portion provided between the contact portion and the external connection portion and embedded in the housing,
wherein in the embedded portion,
groove portions are formed in a front surface of the metal terminal and a rear surface of the metal terminal,
the groove portions in the front surface and the groove portions in the rear surface are alternately formed,
each of the groove portions is formed of a single continuous groove extending in an extending direction of the embedded portion, and
the groove portions extend in a widthwise direction that is a direction intersecting the extending direction of the embedded portion.

2. The switch according to claim 1, wherein the groove portions each have a cross-sectional shape becoming narrower in groove width as the groove portions become deeper.

3. The switch according to claim 1, wherein the groove portions each have an inner surface that is a coarse surface.

4. The switch according to claim 1, wherein in the embedded portion, bump portions are formed along edge portions of the groove portions.

5. The switch according to claim 1, wherein each of the groove portions is formed to penetrate across the embedded portion in the direction intersecting the extending direction of the embedded portion.

6. The switch according to claim 1, wherein each of the groove portions has a rectangular cross-sectional shape that is open at a top portion thereof.

7. The switch according to claim 1, wherein the embedded portion includes a narrow-width portion that is partially narrow in width, and the groove portions are formed in the narrow-width portion.

8. The switch according to claim 7, wherein the groove portions are formed through a laser processing.

9. The switch according to claim 8, wherein the groove portions each have a cross-sectional shape becoming narrower in groove width as the groove portions become deeper.

10. The switch according to claim 8, wherein the groove portions each have an inner surface that is a coarse surface.

11. The switch according to claim 8, wherein in the embedded portion, bump portions are formed along edge portions of the groove portions.

12. The switch according to claim 1, wherein the groove portions are formed through a laser processing.

13. The switch according to claim 12, wherein the groove portions each have a cross-sectional shape becoming narrower in groove width as the groove portions become deeper.

14. The switch according to claim 12, wherein the groove portions each have an inner surface that is a coarse surface.

15. The switch according to claim 12, wherein in the embedded portion, bump portions are formed along edge portions of the groove portions.

* * * * *